United States Patent [19]
Chisholm

[11] 3,799,630
[45] Mar. 26, 1974

[54] TEXTILE SPINNING MACHINES
[75] Inventor: Andrew Alexander Chisholm, Clitheroe, England
[73] Assignee: Platt International Limited, Oldham, Lancashire, England
[22] Filed: Nov. 14, 1972
[21] Appl. No.: 306,209

[30] Foreign Application Priority Data
Nov. 16, 1971  Great Britain................ 53191/71

[52] U.S. Cl. .............................................. 308/9
[51] Int. Cl. ........................................ F16c 17/16
[58] Field of Search............................. 308/122, 9

[56] References Cited
UNITED STATES PATENTS
2,951,729   9/1960   Skarstrom.......................... 308/9

Primary Examiner—Charles J. Myhre
Assistant Examiner—Frank Susko

[57] ABSTRACT

An open end spinning unit having a spinning rotor carried on one end of a driven shaft, which shaft is mounted for rotation in at least one flexibly mounted gas bearing, includes a double acting thrust bearing for limiting axial movement of the shaft in either direction. The thrust bearing comprises a first thrust element which is fixed on and rotates with the shaft and presents a first thrust surface, and a second thrust element presenting a second thrust surface opposite to and for cooperation with the first thrust surface, the second thrust element being resiliently mounted. Means are provided for introducing a gas between the said thrust surfaces, the said thrust elements being arranged in a chamber so that gas escaping from between the thrust surfaces enters the chamber and acts on that face of the first thrust element opposite to the face presenting the first thrust surface.

18 Claims, 5 Drawing Figures

TEXTILE SPINNING MACHINES

This invention concerns a high speed direct drive open-end spinning unit incorporating a thrust bearing for a shaft of the unit.

Direct drive spinning units of this type include a metal spinning cup or rotor which is mounted on one end of a metal shaft which is in turn mounted in gas bearings. Such a unit is described in our co-pending application No. 53229/70 now U.S. Pat. No. 3,657,467.

A hitherto proposed direct drive unit consists of a shaft which is supported in aerodynamic bearings, the centre of the shaft between the bearings being contacted by a tangential driving tape, a rotor at one end of the shaft, and the opposite end being turned to a cone tip. The tip contacts a graphite block which forms the end bearing of the unit.

Graphite thrust bearings as simple as this are unsatisfactory because the shaft tip tends to wear a seat in the block and this interfers with the shaft's necessary passage through and beyond a whirl condition when accelerating up to top speed. The radial shaft movement caused during whirl is damped by flexible mounting interposed between the aerodynamic bearings and housings. Any thrust bearing for use with such a unit must not interfere with the shaft movement during whirl conditions.

This invention seeks to provide a high speed direct drive open-end spinning unit with a thrust bearing which will fulfil this requirement.

According to the present invention, there is provided an open-end spinning unit including a shaft which is rotatably supported in at least one flexibly mounted gas bearing and which may be driven to rotate by drive means, a spinning rotor carried on one end of the shaft and rotatable therewith, and a thrust bearing for limiting axial movement of the shaft comprising a first thrust element which is fixed to the shaft such that it is rotatable therewith and which presents a first thrust surface, a second thrust element presenting a second thrust surface in opposition to and for co-operation with the first thrust surface, the second thrust element being resiliently mounted, and means for introducing a gas between the thrust surfaces to form a gap between them.

Preferably the unit is mounted so that the axis of the shaft is inclined to the horizontal with the spinning rotor lower than the thrust bearing.

The opposite end of the shaft to that carrying the spinning rotor may extend through and beyond its bearing mountings and the first thrust element may be fixed at or near the said opposite end of the shaft. Preferably the second thrust element is annular and the said other end of the shaft extends through the second thrust element. Alternatively the second thrust element may be spaced axially from the end of the shaft and the first thrust element.

The first thrust element and second thrust element may be enclosed in a chamber so that gas, escaping from between the two opposed thrust surfaces, acts upon the reverse face of the first thrust element and tends to oppose any increase in the gap between the two thrust surfaces.

The second thrust element is preferably mounted so that it does not rotate and may be conveniently mounted flexibly on a housing for the shaft by means of a thick O-ring. The thrust element may have a series of small diameter bores leading from an enclosed annular chamber within the second thrust element to its thrust surface so that the gas supplied to the chamber passes through the bores to the gap between the two thrust surfaces.

The gas may be supplied to the annular chamber from a stationary head on the housing through a flexible tube.

The drive means may be a wheel or belt contacting the shaft. Alternatively the drive means may be an electric motor the rotor of which is secured to the shaft.

One embodiment of the invention will now be described by way of example only, with reference to the accompanying drawings in which.

Figure 1:
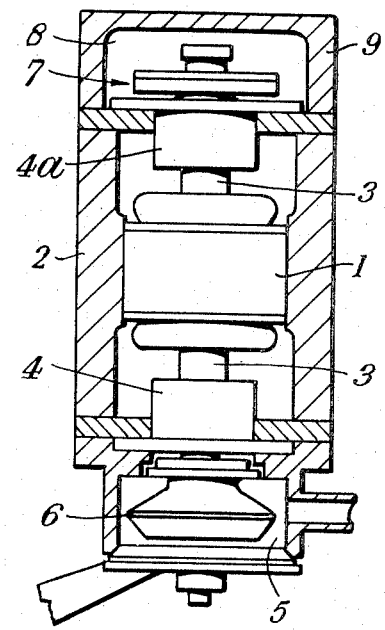
FIG. 1 is a schematic elevation of a first embodiment of an open-end spinning unit according to the invention incorporating a thrust bearing.

Referring firstly to FIG. 1, a spinning unit comprises an induction motor 1 carried in a housing 2 and connected to a drive shaft 3 rotatably supported in air bearings 4 and 4a.

A spinning chamber 5 is secured to one end of the housing 2, and a spinning rotor 6 carried on the shaft 3 is arranged within the spinning chamber 5. A thrust bearing 7 acts on the other end of the shaft 3 and is arranged within a thrust bearing chamber 8 provided in a thrust bearing cover 9 secured to the other end of the housing 2. Under normal operating conditions the unit is mounted at 25° to the horizontal so that the spinning chamber 5 is lower than the thrust bearing 7.

Figure 2:
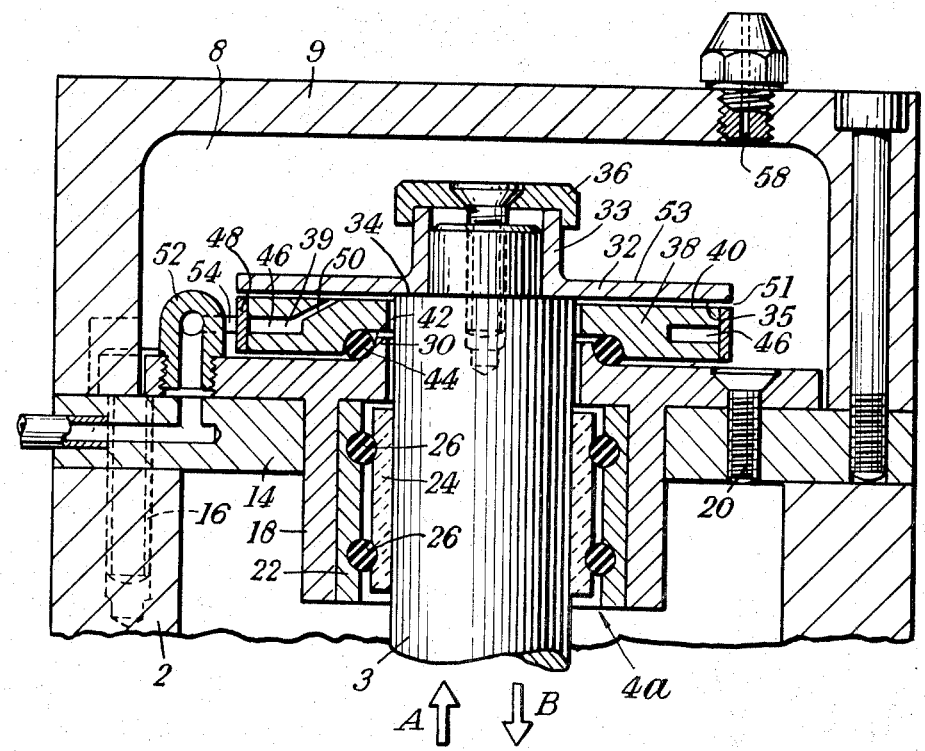
FIG. 2 is a sectional side elevation of the thrust bearing shown schematically in FIG. 1.

Referring now to FIG. 2 which shows the thrust bearing 7 more clearly the cylindrical motor housing 2 is closed at one end by an annular end wall 14. The end wall 14 is secured to the housing 2 by bolts 16. An annular main bearing housing 18 is secured to the end wall 14 by screws 20. The housing 18 supports a grooved sleeve 22 carrying two rubber O-rings 26 in the grooves and a glass aerodynamic bearing sleeve 24 of the air bearing 4a is flexibly supported in the two rubber O-rings 26. The air bearing 4 is of similar construction. The bearings 4, 4a support the shaft 3 of the induction motor 1, and the said other end of the shaft 3 extends through and beyond the bearing 4a. The face of the main bearing housing 18 which defines the floor of the chamber is raised to provide a flange 30 surrounding the shaft 3 the purpose of which will be described later.

The thrust bearing consists of a stationary thrust annulus 38 and the said other end of the shaft 3 extends through the annulus 38 and into the thrust bearing chamber 8. A thrust disc 32 is secured to the said other end of the shaft 3 and is rotatable with it. The disc 32 has a central boss 33 which is located over the end of the shaft 3 such that it abuts against a shoulder 34 and the boss 33 is clamped to the end of the shaft 3 by a screw and cap 36. One face of the annulus 38 constitutes a thrust surface 40 and is arranged in opposition to a thrust surface 35 of the disc 32 whilst the other face of the annulus 38 is recessed to form a seat 42 for an O-ring 44 which fits over the flange 30 on the bearing housing 18. A deep circumferential groove 39 is provided in the annulus 38, and this is enclosed to form an annular chamber 46 by a metal ring 48 which extends around the periphery of the annulus 38. Several small diameter bores 50 lead from the annular chamber 46 to the thrust surface 40. The chamber 46 is supplied with compressed air from a head 52 mounted on the bearing housing through a flexible tube 54.

In operation of the spinning unit the bearing works as follows. The thrust bearing is pressurized by feeding compressed air into the chamber 46 and through the bores 50 to between the thrust surfaces 40 and 35 thus separating the disc 32 from the annulus 38 against the action of the weight of the shaft 3 and components attached thereto, and maintaining an air gap 51 between the thrust surfaces 35 and 40 of about one thousandth of an inch. The air flows continuously into the gap 51 and escapes from the gap 51 between the edges of the disc 32 and annulus 38 and vents to atmosphere through a control orifice 58 provided in a plug in the bearing cover 9. The air in the chamber 8 acts on the back face 53 of the disc 32 and the surface of the cap 36.

Figure 3:
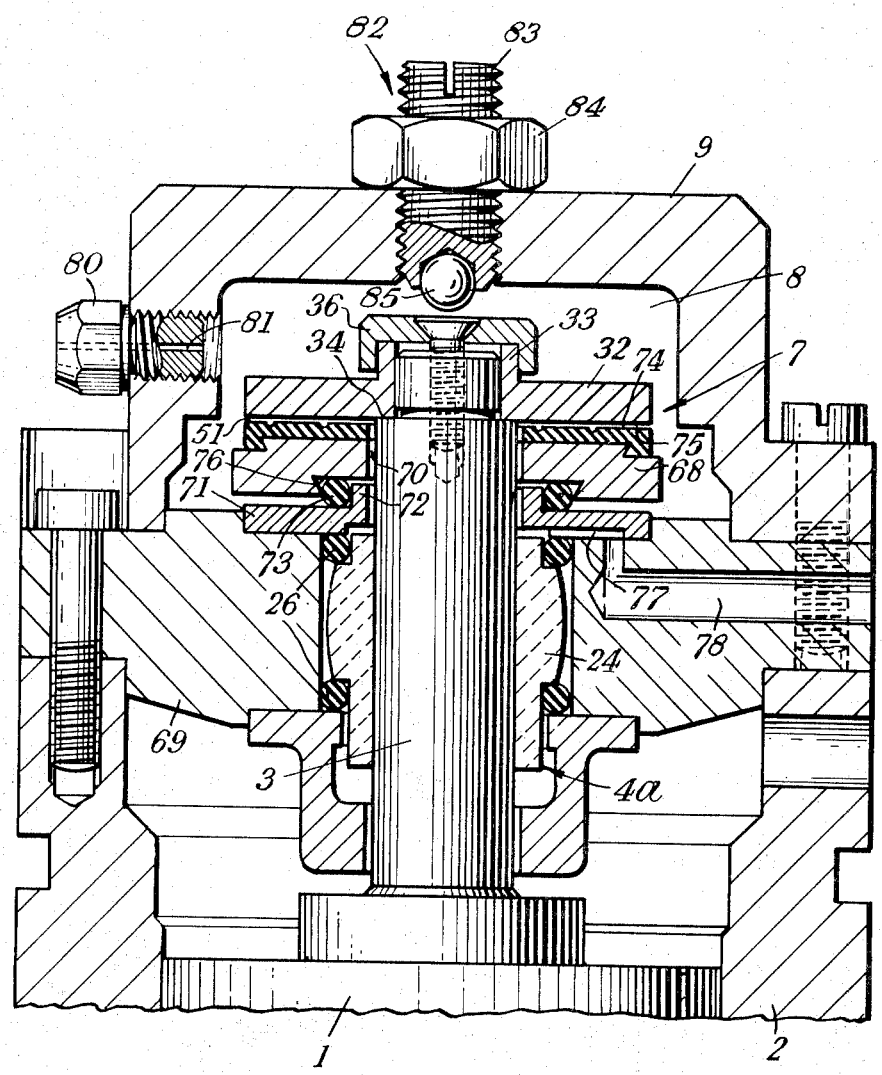
FIG. 3 is a sectional side elevation of a thrust bearing incorporated in a second embodiment of an open-end spinning unit.

In the thrust bearing shown in FIG. 3 those parts which are the same as parts of the thrust bearing shown in FIG. 2 are indicated by like reference numerals and will not be described in detail.

The thrust bearing shown in FIG. 3 includes a stationary thrust annulus 68 mounted on an end wall 69 of the motor housing 2. The end of the shaft 3 extends through and beyond the bearing 4a and passes through the aperture 70 of the thrust annulus 68 into the chamber 8, and the central boss 33 of the thrust disc 32 is secured to the end of the shaft 3.

An annular plate 71 is secured to the end wall 69 of the motor housing 2 and the plate 71 has an annular flange 72 extending around the shaft. A resilient O-ring 73 is located around the flange 72.

One face of the thrust annulus 68 constitutes a thrust surface 74 and is arranged in opposition to a thrust surface 75 on the thrust disc 32, whilst the other face has an annular groove 76 into which the O-ring 73 seats whereby the annulus is resiliently mounted on the end wall 69 of the motor housing 2. The thrust surface 74 is provided with spiral grooves.

Below the annular plate 71 is provided a narrow duct 77 communicating at one end with the gap between the annular flange 72 and the shaft 3 and at the other end with an air inlet bore 78 extending through the end wall 69 of the motor housing 2.

The thrust bearing cover 9 is provided with screw plug 80 screwed into a threaded bore in the cover 9 and a narrow orifice 81 extending axially through the plug connects the thrust bearing chamber 8 with atmosphere.

The thrust bearing cover 9 is also provided with an adjustable end stop, indicated generally at 82, for restricting axial movement of the shaft. The end stop comprises a stud 83 screwed into a threaded bore provided in the thrust bearing cover 9 in axial alignment with the shaft, and a locking nut 84, to maintain the stud in a fixed position relative to the end of the shaft 3. The end of the stud 83 adjacent the end of the shaft is provided with an inset ball 85.

In operation of the thrust bearing shown in FIG. 3 the thrust bearing is pressurized by connecting the bore 78 with a source of compressed air. The compressed air passes through the bore 78, the duct 77 and the gap between the flange 72 and shaft 3, to between the thrust surface 74 and 75 to separate them against the action of the combined weight of the shaft 3 and components attached thereto and form the air gap 51 between them. The motor is then started and the shaft 3 and thrust disc 32 begin to rotate causing the spiral grooves on the surface 74 to exert a pumping action across the thrust surfaces 74 and 75. When the shaft has reached its running speed the source of compressed air may then be disconnected. The pumping action of the spiral grooves causes surrounding air to be drawn into the bore 78 and produces a layer of air between the thrust surfaces 74 and 75 to maintain them separated. The air passes from between the thrust surfaces 74 and 75 into the thrust bearing chamber 8 from where it vents to atmosphere via the orifice 81. The air in the chamber 8 acts on the back face 53 of the disc 32 and the cap 36.

At start up, the acceleration of the shaft 3 produces large variations in thrust on the shaft 3 and it is desirable to supply compressed air to between the thrust surfaces 74 and 75. Similar changes in thrust occur when the shaft 3 is decellerating at shut down and it is therefore desirable during shut down to again supply compressed air to between the thrust surfaces 74 and 75. As the air requirement for pressurizing such a bearing is low it is not economical to continue the supply of compressed air to between the thrust surfaces 74 and 75 throughout the operation of the spinning unit.

In the thrust bearings described with reference to FIGS. 1 and 2, the magnitude and direction of the axial load on the shaft 3 affects the size of the air gap 51 between the thrust surfaces (35 and 40 in FIG. 2 and 74 and 75 in FIG. 3). The equilibrium condition of the thrust bearing is established when the forces acting on the disc 32 in the direction indicated by the arrow B arising from the pressure of the air in the chamber 8 acting on the back face 53 and the cap 36 and from the combined weight of the shaft 3 and components attached thereto are balanced by the force exerted in the opposite direction (indicated by arrow A) arising from the pressure of the air in the air gap 51 acting on the thrust surface 35 or 75.

If, during operation, the axial load on the shaft 3 increases in the direction indicated by the arrow A, the shaft 3 moves in this direction and the size of the air gap 51 is increased so that more air escapes into the chamber 8. However because of the fixed orifice 58 in FIG. 2 and orifice 71 in FIG. 3, air cannot escape more quickly from the chamber 8, so that the pressure in the chamber 8 acting on the back face 53 and cap 36 builds up. The force produced by the gas pressure acting on the back face 53 and cap 36 together with the force due to combined weight of of the shaft 3 and components attached thereto causes the disc 32 to move towards the equilibrium condition and the size of the air gap 51 is decreased. Conversely if the axial load on the shaft 3 increases in the direction indicated by the arrow B the air gap 51 decreases and less air escapes into the chamber 8. Thus the pressure in the chamber 8 acting on the back face 53 and the cap 36 drops, and the pressure of the air in the gap 51 increases causing the disc 32 to move towards the equilibrium condition and increasing the size of the air gap 51.

When the motor passes through a whirl condition the shaft deflects through a small distance, and the plane of the disc 32 tilts correspondingly. The resilience provided by the O-ring 44 in FIG. 2 and 73 in FIG. 3 on which the annulus 38 in FIG. 2 and 68 in FIG. 3 is mounted enables the thrust annulus to tilt with the disc 32, whilst maintaining the air gap 51 between the thrust surfaces.

It will be appreciated that provided the unit is mounted with the spinning rotor 6 lower than the thrust bearing 7, the thrust bearing chamber 8 may be dispensed with since the combined weight of the shaft 3 and components attached thereto acts to apply a restoring force on the disc 32 tending to decrease the size of the gap 51. If, however, the unit is mounted horizontally the combined weight of the shaft 3 and components thereto no longer applies a restoring force. In this case it is necessary to provide the thrust bearing chamber 8 whereby the gas pressure in the chamber 8 can apply a restoring force tending to decrease the size of the gap. Since the area of the back face 53 and cap 36 is greater than that of the thrust surface 35, a gas pressure in the chamber 8 lower than the gas pressure in the gap 51 can result in a net force tending to decrease the size of the air gap 51.

Figure 4:
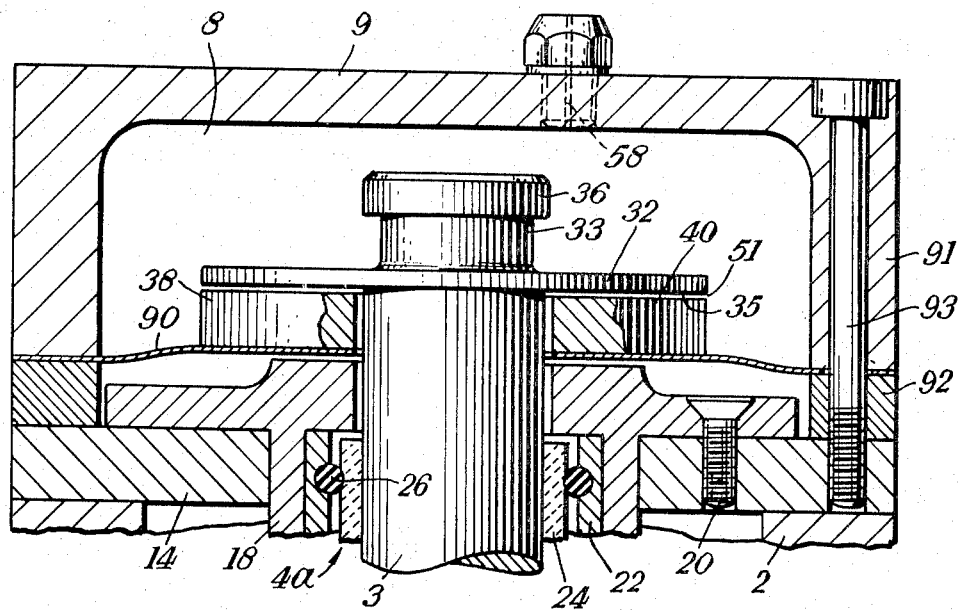
FIG. 4 shows an alternative arrangement for mounting a thrust element of the thrust bearing shown in FIG. 2 or 3.

Instead of mounting the thrust annulus on the housing by means of a resilient ring, it may be mounted by means of a resilient diaphragm. In the embodiment shown in FIG. 4 the diaphragm takes the form of a deformable disc 90 secured to the opposite face of a thrust annulus 38 or 68 to that presenting the thrust surface 40 and clamped at its periphery between an upper and a lower part 91 and 92 of the thrust bearing cover 9. The upper and lower parts 91 and 92 are secured together by bolts 93 which also screw into the end wall 14 of the motor housing 2.

Figure 5:
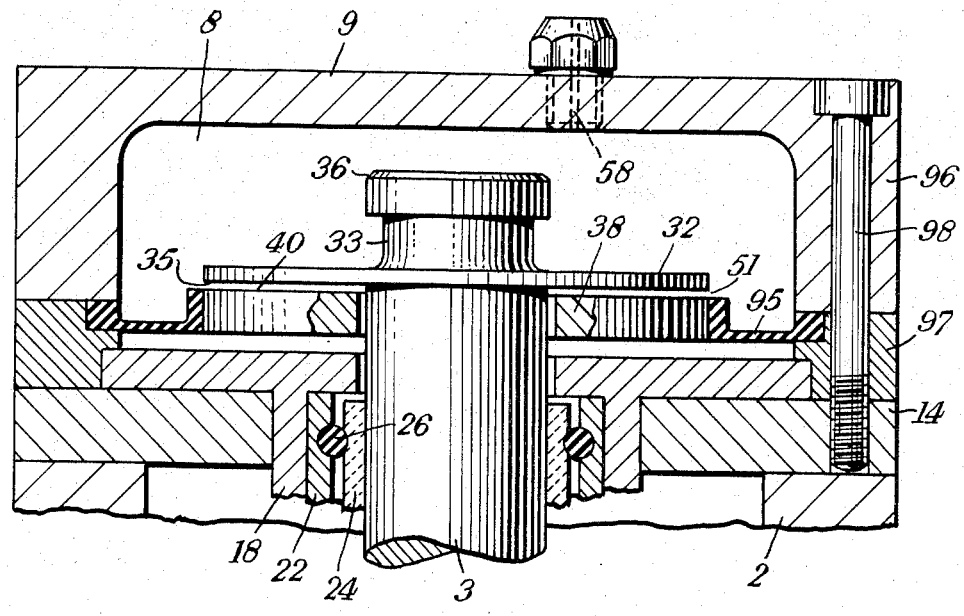
FIG. 5 shows yet another alternative arrangement for mounting a thrust element of the thrust bearing shown in FIG. 2 or 3.

In the embodiment shown in FIG. 5 and resilient diaphragm takes the form of an annular ring 95 of elastomeric material or of densely compacted crimped wire. The inner face of the ring 95 is secured to the periphery of the thrust annulus 38 or 68, and the outer edge of the ring 95 is clamped between an upper and a lower part 96, 97 of the thrust bearing cover 9. As in the embodiment shown in FIG. 4 the upper and lower parts are secured together by bolts 98 which also screw into the end wall 14 of the motor housing 2.

The embodiments provide a double acting thrust bearing with only one set of accurately machined flat surfaces mounted at right angles to the shaft axis.

In practice, however, it is desirable both to amount the unit with the spinning rotor 6 lower than the thrust bearing 7, and provide the thrust bearing chamber 8.

I claim:

1. An open end spinning unit including a shaft, at least one flexibly mounted gas bearing in which the shaft is mounted for rotation, a drive means for driving the shaft, a spinning rotor carried on one end of the shaft and rotatable therewith, and a thrust bearing for limiting axial movement of the shaft, wherein the thrust bearing comprises a first thrust element which is fixed to the shaft such that it is rotatable therewith and which presents a first thrust surface, a second thrust element presenting a second thrust surface in opposition to and for co-operating with the first thrust surface, the second thrust element being resiliently mounted, means for introducing a gas between the thrust surfaces to form a gap between them, and a thrust bearing chamber, the first and second thrust elements being arranged in said chamber so that in operation gas escaping from between the thrust surfaces enters the chamber and acts on an opposite face of the first thrust element to that face presenting the first thrust surface.

2. An open end spinning unit as claimed in claim 1 wherein the unit is mounted with the axis of the shaft inclined to the horizontal with the spinning rotor lower than the thrust bearing.

3. An open end spinning unit as claimed in claim 2 wherein the axis of the shaft is inclined at 25° to the horizontal.

4. An open end spinning unit as claimed in claim 1, wherein the second thrust element is annular and wherein the said other end of the shaft extends through the second thrust element with a clearance between the shaft and the second thrust element, the first thrust element being secured to the said other end of the shaft.

5. An open end spinning unit as claimed in claim 1 wherein the thrust surfaces are annular.

6. An open end spinning unit as claimed in claim 1 wherein the thrust chamber communicates with atmosphere via a narrow orifice whereby, in operation, a flow of gas from between the thrust surfaces into the chamber and through the orifice to atmosphere is allowed, the resistance to flow offered by the orifice being such that the pressure of the gas in the chamber, acting on the said opposite face of the first thrust element is greater than atmospheric pressure, and is dependent on the quantity of gas escaping from between the thrust surfaces.

7. An open end spinning unit as claimed in claim 1 wherein the second thrust element is resiliently mounted on a stationary housing by means of a resilient ring, and whereby the second thrust element is incapable of rotation but capable of tilting movement.

8. An open end spinning unit as claimed in claim 7 wherein an opposite face of the second thrust element to that presenting the second thrust surface is provided with an annular seating, the resilient ring being accommodated between the annular seating and a seating on the housing.

9. An open end spinning unit as claimed in claim 1 wherein the second thrust element is resiliently mounted on a stationary housing by means of a resilient diaphragm whereby the second thrust element is incapable of rotation but capable of tilting movement.

10. An open end spinning unit as claimed in claim 9 wherein the diaphragm is a thin deformable disc and is connected both to an opposite face of the second thrust element to that presenting the second thrust face and the housing for the thrust element.

11. An open end spinning unit as claimed in claim 9 wherein the diaphragm is connected between an outer edge on the second thrust element and the housing and comprises a ring of elastomeric material or densely compacted crimped wire.

12. An open end spinning unit as claimed in claim 1 wherein the means for introducing gas between the thrust surfaces includes a cavity in the second thrust element and a number of ducts connecting the cavity with the gap between the thrust surfaces whereby compressed gas supplied to the cavity passes to the gap.

13. An open end spinning unit as claimed in claim 12 wherein the cavity is an annular chamber

14. An open end spinning unit as claimed in claim 13 including a stationary gas inlet for connection to a supply of compressed gas, and a flexible tube connecting the gas inlet to the cavity.

15. An open end spinning unit as claimed in claim 4 wherein the means for introducing gas between the thrust surfaces, includes spiral grooves formed in one of the thrust surfaces, the grooves acting, in operation, to exert a pumping action across the thrust surfaces to draw gas into the gap between the thrust surfaces via the clearance between the shaft and the second thrust element.

16. An open end spinning unit as claimed in claim 15 including a stationary housing for the unit and a passage in the stationary housing for connection to a supply of compressed gas, the passage communicating with the said clearance between the shaft and the second thrust element, whereby to allow compressed gas to be supplied via the passage and the said clearance to the gap between the thrust surfaces.

17. An open end spinning unit as claimed in claim 1 wherein the shaft is supported in two flexibly mounted gas bearings.

18. An open end spinning unit as claimed in claim 1 wherein the gas is air.

* * * * *